May 16, 1961 R. H. SCHUMAN 2,984,136
ELECTRICALLY CONTROLLED HYDRAULIC DRIVE FOR MACHINE TOOL
Filed March 21, 1957 5 Sheets-Sheet 1

INVENTOR.
RALPH H. SCHUMAN
BY Hudson, Boughton,
Williams, David & Hoffmann
ATTORNEYS

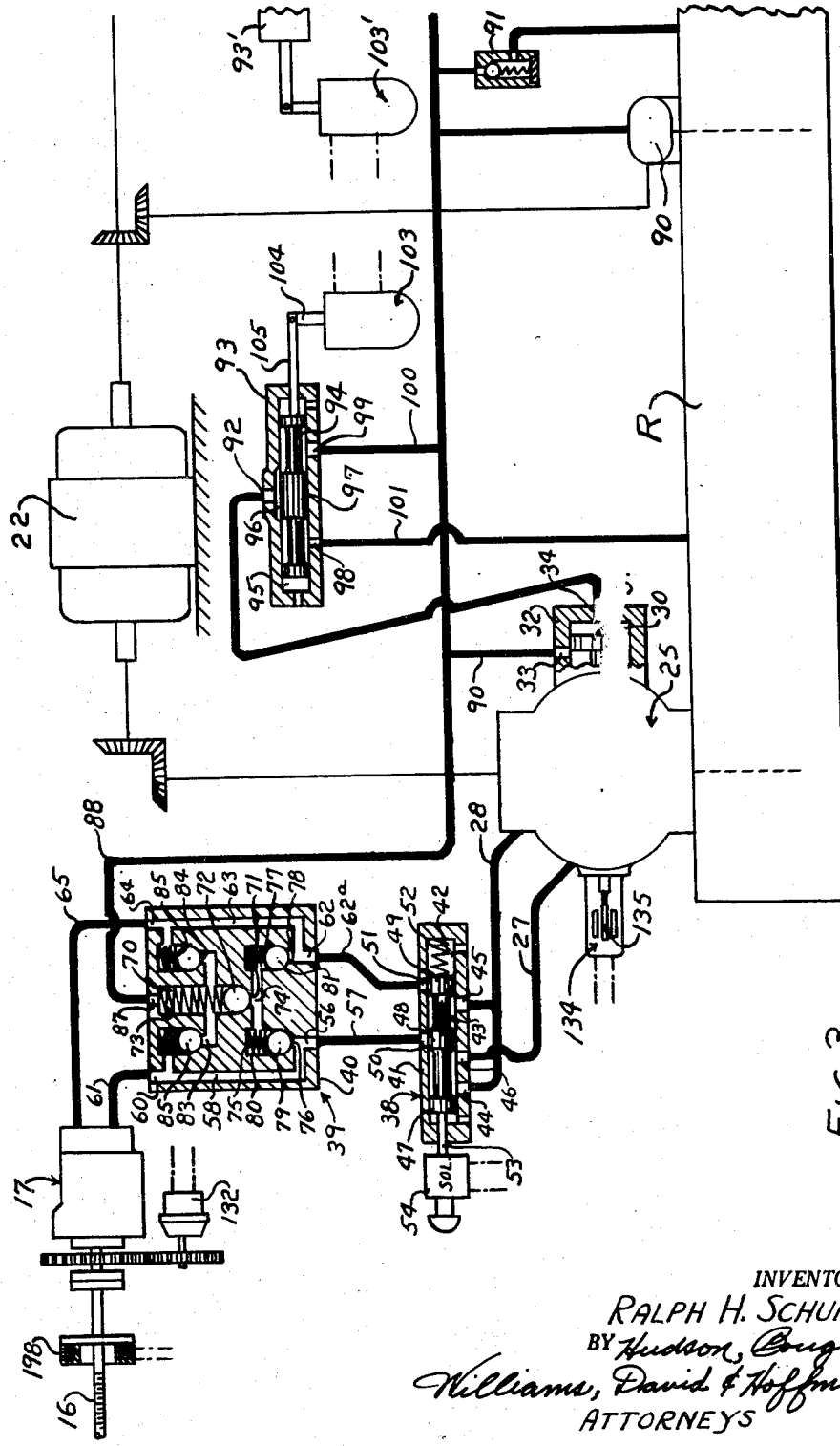

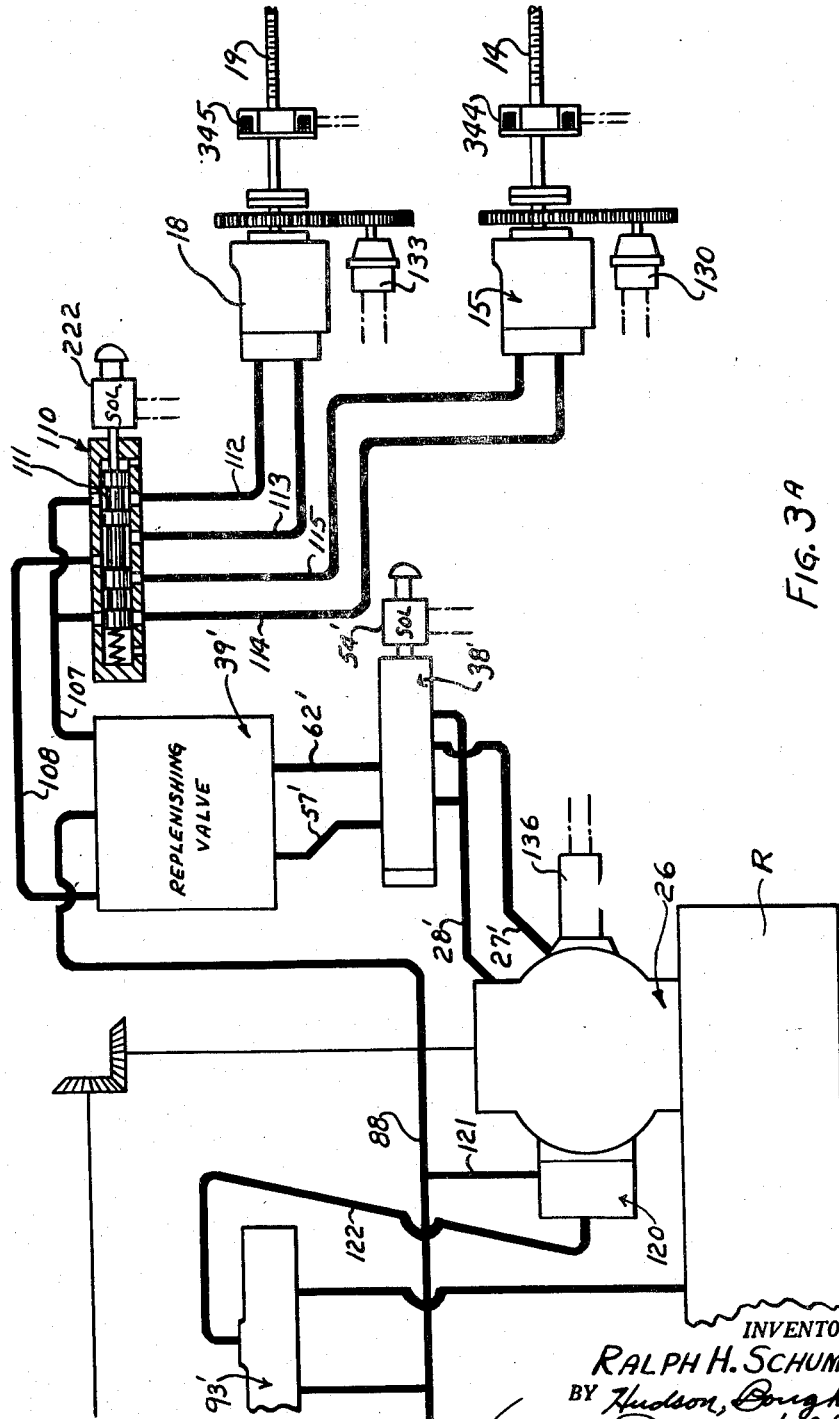

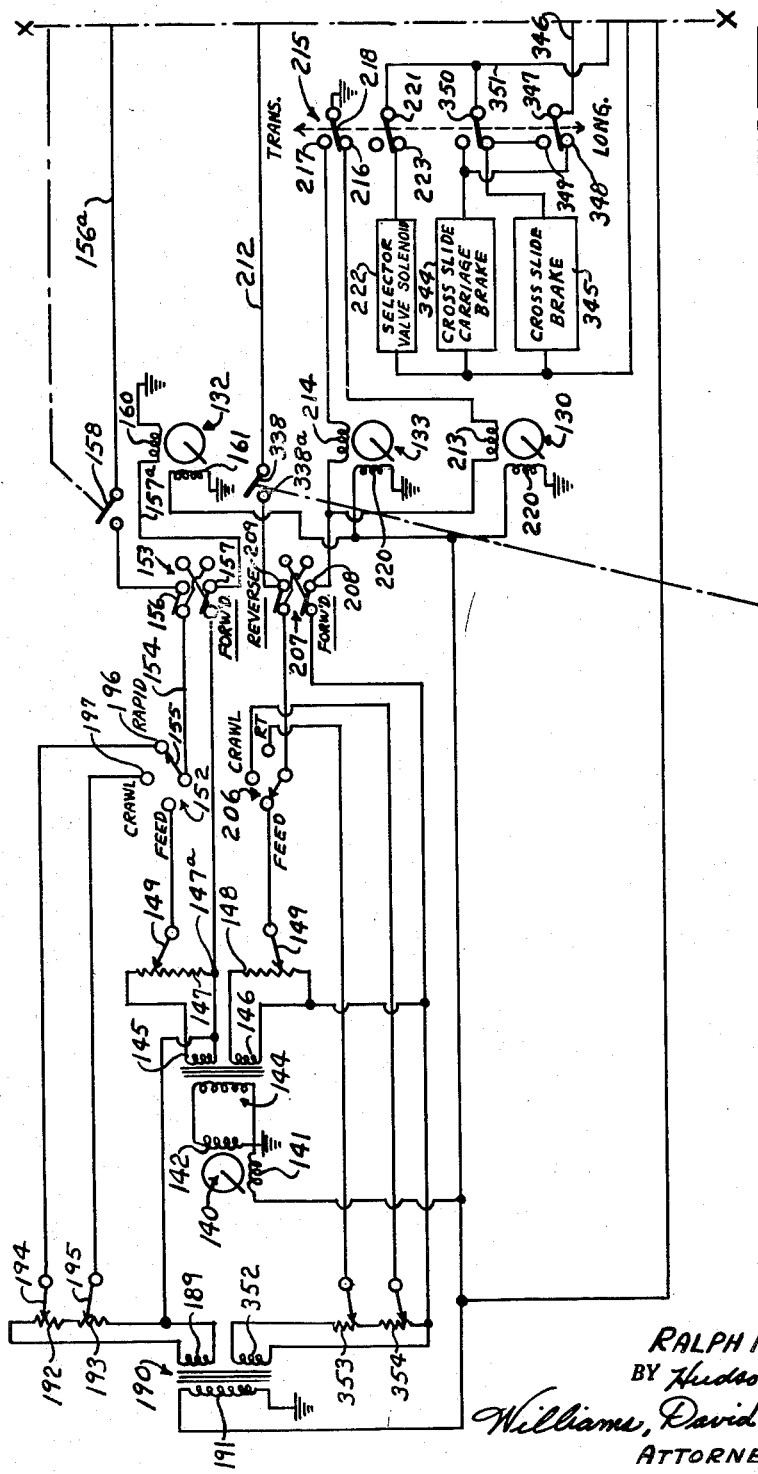

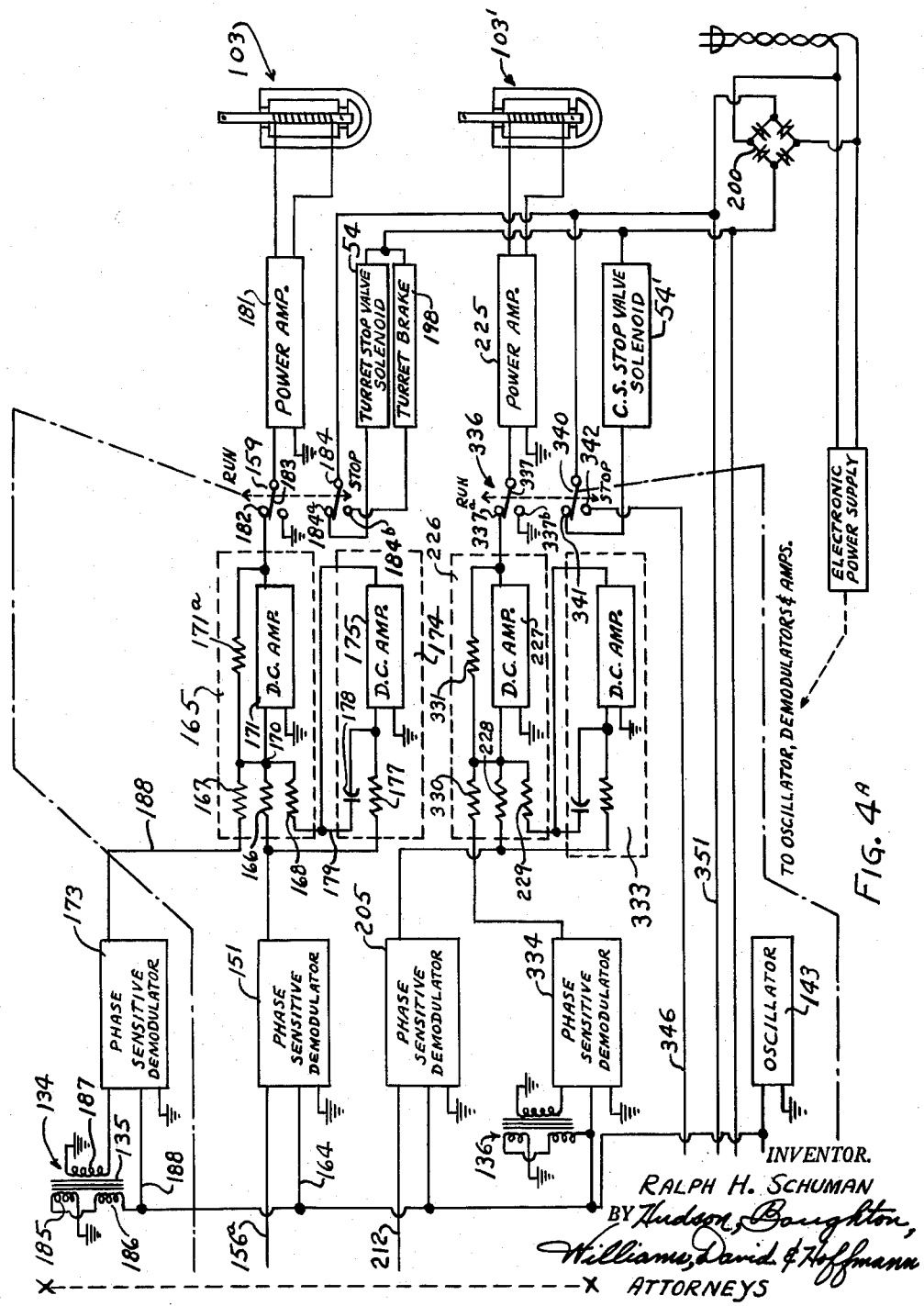

United States Patent Office 2,984,136
Patented May 16, 1961

2,984,136

ELECTRICALLY CONTROLLED HYDRAULIC DRIVE FOR MACHINE TOOL

Ralph H. Schuman, Cleveland, Ohio, assignor to The Warner & Swasey Company, Cleveland, Ohio, a corporation of Ohio Filed Mar. 21, 1957, Ser. No. 647,590

26 Claims. (Cl. 82—21)

The present invention relates to machine tools and, more particularly, to a machine tool having an electrically controlled hydraulic drive for a machine tool element thereof.

An important object of the present invention is to provide in a machine tool a new and improved electrically controlled drive for a machine tool element wherein the direction and speed of movement of the element is determined by the sense and magnitude of a primary signal, with the sense and magnitude of the signal being dependent upon the direction and speed of spindle rotation.

Another object of the present invention is to provide a new and improved machine tool in which an electrically controlled drive is provided for moving a machine tool element in forward or reverse directions to effect relative feed movement with respect to a rotatable spindle and in which the drive includes a variable displacement pump having a movable control element for controlling the operation of the pump and, in turn, the movement of the machine tool element, the control element being actuated in response to a primary signal having characteristics determined by the direction and speed of spindle rotation by means responsive to a differential error signal of the primary signal and signals dependent on the position of the pump control element and the speed of movement of the machine tool element.

Another object of the present invention is to provide in a machine tool a new and improved drive for a movable element of the machine tool wherein the direction and speed of movement of the element is controlled by the sense and magnitude of a primary signal applied to control means for actuating the control member of a variable displacement pump connected in a closed circuit with a reversible fluid pressure motor for driving the element, the closed circuit including a stop valve having a position in which the discharge of the pump is connected directly to the intake of the pump, and preferably further including a replenishing valve which functions to maintain the fluid pressure in the closed circuit above a predetermined minimum and which functions as a safety valve in the event of an excessively high pressure in the conduits.

A further object of the present invention is to provide a new and improved safety and replenishing valve for use in a closed circuit system, the valve having respective passages connected to intake and discharge conduits of the pump for the system and being so constructed and arranged that a predetermined minimum pressure is maintained in the conduits and so that the discharge conduit is connected to the intake conduit when an excessive pressure is present in the former.

The present invention resides in certain constructions and combinations and arrangements of parts and further objects and advantages thereof will be apparent from the following detailed description made with reference to the accompanying drawings forming a part of this specification for all matter disclosed therein, whether or not expressly described, and in which.

Figs. 3 and 3A constitute a diagrammatic view showing the electrically controlled hydraulic drive for the turret, cross slide, and cross slide carriage; and, Figs. 4 and 4A are a schematic showing of the electrical controlled circuit for the hydraulic drive shown in Figs. 3 and 3A.

The present invention is susceptible of various modifications and constructions and of use in various types of machine tools but is preferably embodied in a turret lathe as herein shown and described.

Figure 1:
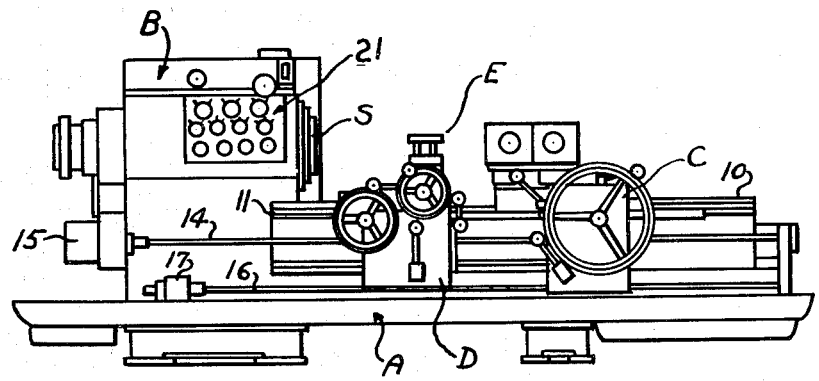
Fig. 1 is a front elevational view of a turret lathe embodying the present invention.
Figure 2:
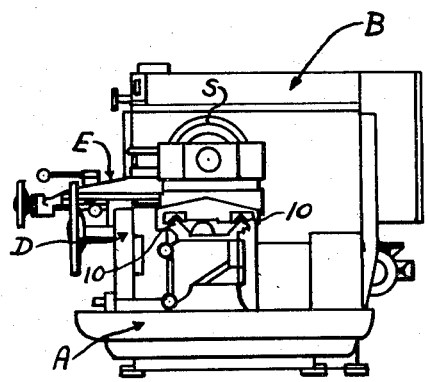
Fig. 2 is an elevational view looking at the right-hand side of the lathe as shown in Fig. 1.

Referring to the drawings, a conventional type of turret lathe is shown in Figs. 1 and 2 and comprises a bed A having a headstock B at one end thereof and longitudinal ways 10 upon which a turret carriage or saddle C is supported for movement toward and away from the headstock B and ways 11 upon which a cross slide carriage D is supported, also for movement toward and away from the headstock B. The cross slide carriage D has a cross slide E supported thereon for movement transversely of the bed A and the axis of a work spindle S rotatably supported in the headstock B with the axis thereof parallel to the ways 10. The cross slide carriage D is movable along its ways 11 by the operation of a lead screw 14 extending longitudinally of the bed A and driven by a reversible fluid pressure motor 15 mounted at the left-hand end of the bed as viewed in Fig. 1. Similarly, the turret carriage or saddle C is moved along its ways 10 by a lead screw 16 extending longitudinally of the bed A and driven by a reversible fluid pressure motor 17. The cross slide is moved transversely of the spindle axis by a reversible fluid pressure motor 18 operatively connected to the cross slide by a lead screw 19. The reversible motor 18 and the lead screw 19 are not shown on the machine but are indicated schematically in Fig. 3A. The movements of the various machine tool elements of the lathe are controlled from a control panel 21 located on the front side of the headstock B and including various control elements to be described.

In the preferred and illustrated embodiment, an electric motor 22 is connected in driving relationship with variable displacement pumps 25, 26 for supplying pressure fluid to the motors 15, 17, 18. Pressure fluid for operating the motor 17 for moving the turret carriage C is supplied from the variable displacement pump 25 and pressure fluid for operating the reversible motors 15, 18 for moving the cross slide carriage D and the cross slide E is supplied from the variable displacement pump 26. The variable displacement pumps 25, 26 are alike and are of a conventional commercial construction and any suitable drive connection may be provided between the motor 22 and the pumps 25, 26. The pumps are each shown as connected to a respective pair of conduits and during the pumping operation, one of the conduits functions as a discharge conduit and the other functions as a return conduit for the particular pump depending upon the direction of pumping.

The pumps 25, 26, are of the same construction and therefore only the pump 25 will be described in detail. The pump 25 is connected to a pair of conduits 27, 28 which function as discharge and intake conduits and the pump includes a rod 30 which is movable to determine the volume of liquid pumped and the direction of pumping. The rod 30 is connected at its outer end to a piston 31 which is operable in a closed cylinder chamber 32 having a port 33 communicating with the side of the piston 31 to which the rod 30 is connected and a port 34 communicating with the other side of the piston. The rod 30 diminishes the projected area of the piston on the side to which it is connected and therefore the piston 31 is a differential area piston having a smaller projected area on one side than on the other side. The piston 31 has a neutral position in which there is substantially no fluid pumped and when the piston is moved therethrough the direction of pumping is reversed. If equal fluid pressures are supplied to the opposite sides of the piston through the ports 33, 34 respectively, the piston 31 will move in the direction of rod 30, toward the left as viewed in Fig. 3, and if the pressure fluid on the small area side of the piston 31 is sufficiently greater than the pressure of the fluid on the large area side so as to overcome the force exerted thereby, the piston 31 will move to the right. The magnitude of the displacement from its neutral position determines the volume of the liquid pumped, with the neutral position being zero or minimum volume and the direction of displacement determines whether conduit 27 or conduit 28 functions as the discharge conduit.

The discharge and intake connections 27, 28 of the variable displacement pump 25 are connected to the reversible fluid pressure motor 17 for moving the turret carriage through a stop valve 38 and a combined replenishing and safety valve 39 having a valve body 40. The stop valve is a two-position valve having a stop position where the conduits 27, 28 are placed in communication with each other and a second position where the conduits are connected to the motor 17 and is shown as comprising a valve body 41 having a bore 42 in which a valve spool 43 is operable. The conduit 28 from the pump 25 is connected to a pair of ports 44, 45 in the valve body 41 which communicate with the bore 42 while the conduit 27 is connected to a single port 46 positioned intermediate the ports 44, 45. The valve spool 43 is provided with three lands 47, 48 and 49 which when the valve is in a stop position respectively block ports 50, 51 on the opposite side of the valve body to the ports 44, 46. In this position the ports 44, 46 are between the lands 47, 48 and are therefore in communication with each other, while the port 45 is between the lands 48, 49, and is, in effect, blocked. The valve spool 43 is biased to the described position by a spring 52 interposed between one end of the valve spool and a closed end of the bore 42. The valve spool 43 has a rod 53 extending from the end thereof adjacent the land 47 outwardly through the other closed end of the bore 42 and a solenoid 54 is provided for moving the rod 53 to shift the valve spool against the bias of the spring 52. Energization of the solenoid 54 will cause the valve spool 43 to shift against the bias of the spring 52 to place the port 46 in communication with the port 50 and the port 45 in communication with the port 51 to provide connections for the conduits 27, 28 through the stop valve 38.

The port 50 of the stop valve 38 is connected to a port 56 in one side of the valve body 40 of the valve 39 by a conduit 57, the port 56 in turn communicating with a passage 58 extending through the valve body and communicating with a port 60 opening into its other side. The port 60 is connected to one fluid pressure side of the reversible motor 17 by a conduit 61. Similarly, the port 51 of the stop valve 38 is connected to a port 62 in the valve body 40 by a conduit 62a which in turn communicates with a passage 63 extending through the valve body and opening into a port 64 on the other side of the body. The port 64 is connected to the other fluid pressure side of the reversible motor 17 by a conduit 65.

It can now be seen that if the conduit 27 is functioning as the discharge conduit of the pump 25, fluid pressure is supplied to one side of the motor 17 through a path which includes the conduit 27, the ports 46, 50 of the stop valve 38, the conduit 57, the ports 56 and 60 of the valve body 40 and the conduit 61 connected between the valve 39 and the motor 17. Similarly, the other side of the motor 17 is connected to the suction side of the pump through the conduit 65, the passage 63 in the valve body 40, the conduit 62a, the ports 51, 45 of the stop valve 38 and the conduit 28. If the conduit 28 is the discharge conduit of the pump 25, it will be understood that fluid pressure is supplied through the conduit 65 to the hydraulic motor 17 and the latter rotates in the opposite direction from that when the conduit 27 is functioning as the discharge conduit. In either case, the system between the pump 25 and the motor 17 is a closed system.

The valve 39 functions as a replenishing valve and as a safety valve for the closed system between the pump 25 and the motor 17. To this end, the valve body of the valve 40 is provided with a bore 70 intermediate the passages 58, 63 and which is supplied with fluid under pressure. One end of the bore 70 opens into a restricted passage 71 with fluid flow between the bore 70 and passage 71 being controlled by a ball check valve 72 urged to a position closing the restricted passage by a spring 73 in the bore 70 and only permitting flow into the bore 70. The restricted passage 71, in turn, communicates with the passages 58, 63 through a cross bore 74 which opens at one end into a bore 75 having a restricted outlet 76 which communicates with the passage 58 and at the other end into a bore 77 having a restricted outlet 78 which communicates with the passage 63. Fluid flow may take place from the passage 58 into the bore 75 through the restricted outlet 76 but is prevented from flowing in the opposite direction by a ball check valve 79 biased into a position blocking the restricted outlet 76 by a spring 80 in the bore 75. Similarly the bore 77 has a ball check valve 81 therein which is spring biased to a position which only permits fluid flow from the restricted outlet 78 into the bore 77.

The passages 58, 63 are also in communication with the bore 70 through passageways 83, 84 respectively which open into the bore 70 and which include spring biased ball check valves 85 that permit fluid to flow through the passageways in the direction from the bore 70 and prevent fluid flow in the opposite direction.

The end of the bore 70 remote from the restricted passageway 71 and the ball check valve 72 is connected through a port 87 and a conduit 88 to the discharge of a priming pump 90 which maintains a constant pressure in the conduit 88. The pressure maintained by the pump 90 is governed by a pressure relief valve 91 connected between the conduit 88 and a reservoir R for the priming pump 90. The pressure maintained by the relief valve 91 is equal to the minimum exhaust or suction pressure desired in the closed hydraulic system between the pump 25 and the motor 17. Assuming that the conduit 65 to the motor 17 is functioning as the exhaust conduit, as long as the pressure therein is equal to or greater than the pressure in the conduit 88 flow will not occur into the passage 63, which is now functioning as an exhaust passage, through the check valve 85 therein. If, however, the pressure in the passage 63 drops to a point where the pressure in conduit 88 exceeds the exhaust pressure and the spring force urging the valve 85 to its closed position, the valve 85 in passage 63 will open and the closed system will be primed with additional pressure fluid from the priming pump 90. The valve 85 in the passageway 83 is maintained in a closed position by reason of the discharge pressure present in passageway 58. If, however, the conduit 61 and the passage 58 are functioning as the exhaust side of the system, the valve 85 in the passage 83 will open when the spring force urging it to a closed position and the exhaust pressure in the passage 58 are overcome by the pressure in the conduit 88 and the system will again be replenished with pressure fluid from the priming pump. If for some reason or other the pressure in the closed system increases to a point beyond that which is safe, one of the valves 79, 81 will open, depending upon which side of the system is subject to the high pressure to discharge the high pressure into the cross passage 74 which will in turn open the valve 72 to discharge the high pressure through one of the valves 85 into the exhaust side of the system. It can now be seen that the valve 40 functions as both a replenishing valve and as a safety valve.

The volume of liquid discharged by the pump 25 and the direction of pumping is controlled in the illustrated embodiment by controlling the fluid pressure supplied through the port 34 to the cylinder chamber 32 of the pump 25 to control the movement of the adjusting rod 30 of the pump. In the illustrated embodiment the small area side of the piston 31 is subject to a fluid pressure equal to the pressure in the conduit 88, the latter being connected to the cylinder 32 on the small area side of the piston through a conduit 90 connected to the port 33. The port 34 which is in communication with the cylinder chamber 32 on the large area side of the piston 31 is connected to a port 92 of a servo valve 93. The servo valve 93 has a valve member 94 which is operable in a closed bore 95 in the valve body. Port 92 opens into the bore 95 at approximately the midpoint of its length and the side wall of the bore about the port 92 is recessed as indicated at 96. The valve member 94 has a land 97 positioned adjacent the recess 96 but of shorter axial extent so that fluid flow may take place between the bore 95 and the recess 96 by either end of the land 97 when the land is centrally positioned with respect to the recess 96. The valve body of the servo valve 93 also has a port 98 which opens into the bore 95 on one side of the land 97 and a port 99 which opens into the bore 95 on the other side of the land 97. The port 99 is connected to the discharge conduit of the pump 90 by a conduit 100 while the port 98 is connected to the reservoir for the pump 90 by a conduit 101. When the valve member 94 is positioned centrally in the bore 95, pressure fluid will flow from the conduit 100 through the port 99 into the bore 95, past one end of the land 97 into the recess 96, and from the recess 96 past the other end of the land 97 through the bore 95 and the port 98 to the reservoir for the priming pump. It can be seen that if the land 97 is shifted from its central position toward the port 99, the pressure in the recess 96 will diminish, while if it is shifted in the opposite direction the pressure will increase. Since the recess 96 is in communication with the cylinder chamber on the large area side of the piston 31, the pressure therein determines the pressure applied to the large area side of the piston and by shifting the valve member 94 to increase the pressure in the recess 96, the piston 31 may be moved in one direction and by decreasing the pressure in recess 96 it may be moved in the other direction. The valve member 94 is shifted, in the illustrated embodiment, by a torque motor 103 having an armature 104 connected to a rod 105 which extends outwardly from the valve member 94 through a closed end of the bore 95. When the armature 104 is in its zero or neutral position, its position with no current flowing in the torque motor, the land 97 is positioned so that the pressure in recess 96 is of the magnitude necessary for the forces on the opposite sides of the piston 31 to be equal so that the piston is held in its immediate position. It can be seen, therefore, that if the torque motor armature moves from its zero position, the land 97 will move to cause movement of the piston in a direction dependent upon the direction of movement of the armature. The current to the torque motor 103 is controlled in a manner to be described in detail to control the shifting of the valve member 94.

The pump 26 is of the same construction as the pump 25 and is connected to the fluid pressure motors 15, 18 through a closed circuit hydraulic system similar to that between the pump 25 and the fluid pressure motor 17. This closed circuit system includes a pair of conduits 27', 28' connected to the pump 26 at their one ends and function as either discharge or suction conduits depending upon the direction of pumping and having their other ends connected to a stop valve 38'. The stop valve 38' is urged to a first position where the conduits 27', 28' are placed in communication with each other and is movable to a second position by the energization of a solenoid 54' or manually to place the conduits 27', 28' in communication with conduits 57', 62' respectively which are connected to ports of a combined replenishing valve and safety valve 39'. The valve 39' is similar in all respects to the valve 39 and the description thereof will not be repeated.

The conduits 57', 62' are continuously in communication, by means of internal passages in the valve 39', with conduits 108, 107, respectively, connected to the valve 39' at their one ends and at their other ends to a selector valve 110. The selector valve 110 is a two-position valve and includes a valve spool 111 having lands thereon which function, when the selector valve is in its first position, to place the conduits 107, 108 in communication with conduits 112, 113 respectively leading to the opposite fluid pressure sides of the motor 18. When the selector valve 110 is in its second position the conduits 107, 108 are placed in communication with conduits 114, 115, respectively, leading to the opposite sides of the fluid pressure motor 15. The selector valve 111 is manually shiftable between its two positions. It can now be seen that when the conduit 27' connected to the pump 26 is the discharge conduit leading from the pump, the motor 15 or the motor 18, depending upon the setting of the selector valve 110, will be driven in one direction and that when the conduit 28' is functioning as the discharge conduit, the motor 15 or the motor 18, depending upon the setting of the selector valve, will be driven in its opposite direction.

The direction of pumping and the volume of liquid pumped by the pump 26 is controlled by means of a fluid pressure actuated means 120 comprising a cylinder chamber and a differential piston similar to the differential piston 31 and the cylinder chamber 32 of the pump 25. A conduit 121 connects the discharge of the priming pump 90 to the small area side of the piston of the fluid pressure actuated means 120 while a conduit 122 is in communication with the cylinder on the large area side of the piston. The pressure on the large area side of the piston is controlled by the operation of a servo valve 93' having a valve member which is shifted by a torque motor 103'. The torque motor 103' and the valve 93' are the same in all respects as the torque motor 103 and the valve 93 for controlling the operation of the pump 25 and therefore will not be further described.

In the illustrated machine, the turret, cross slide, and cross slide carriage are moved at speeds dependent upon the speed of rotation of the spindle and in directions dependent upon the direction of spindle rotation. To this end the torque motors 103, 103' are energized, when the speed of the corresponding element does not correspond to speed of rotation of the spindle, by an electric current or error signal having characteristics dependent on the direction and speed of spindle rotation and preferably including components dependent upon both the speed of movement of the element being controlled by the torque motor and the position of the controlling piston of the variable displacement pump controlled by the torque motor. The signal components indicative of the rates of movement of the turret, cross slide carriage and cross slide are derived from induction tachometers 130, 132, 133 geared respectively to the motors 15, 17 and 18 for operating the cross slide carriage, the turret, and the cross slide. The component of the electrical signal for controlling the torque motor 103 or the torque motor 103' which is indicative of the position of the piston for the variable displacement pump under the control of the particular torque motor is obtained from a differential transformer having a core element which is moved axially in accordance with the movement of the corresponding control piston. In the illustrated machine, the variable displacement pump 25 is shown as having a differential transformer 134 supported thereon with the transformer having a core 135 moved in accordance with the movements of the piston 31. The variable displacement pump 26 is similarly provided with a differential transformer 136.

Referring to Figures 4, 4a which are schematic diagrams of the control circuit for the torque motors 103, 103', it will be seen that a primary signal having a magnitude dependent upon the speed of spindle rotation and an instantaneous polarity or phase dependent upon the direction of rotation of the spindle is obtained from an induction tachometer 140 geared to the spindle drive. The induction tachometer 140 is not shown on the machine but is indicated schematically in Fig. 4 and includes a field coil 141 and an output coil 142. The field coil 141 is energized by an oscillator 143 of any suitable type. The induction tachometer 140 will not be described in detail since it is a conventional, commercially available instrument and it is sufficient to state that the magnitude of the voltage induced in the output coil 142 depends upon the speed of rotation of the spindle and is of one or two opposite phases or polarity depending upon the direction of rotation of the spindle.

The output from the spindle tachometer 140 is connected to the primary of a transformer 144 having a pair of secondary coils 145, 146. The outputs of the secondary coils 145, 146 and transformer 144 are respectively connected across potentiometer resistances 147, 148, each having a movable tap 149. The voltage appearing across the potentiometer resistance 147, or a selected portion thereof, provides a primary signal for controlling the operation of torque motor 103 while the voltage appearing across the potentiometer resistance 148 or a selected portion thereof, provides a primary signal for controlling the operation of the torque motor 103'. The circuits interconnecting the potentiometer resistance 147 and the torque motor 103 and the circuit interconnecting the potentiometer resistance 148 and the torque motor 103' are substantially the same and, therefore, only the first-mentioned circuit will be described in detail. Any differences, however, between the circuits will be pointed out in detail.

The movable tap 149 of the potentiometer resistance 147 and one end of 147a of the potentiometer resistance 147 are connected to the input of a phase-sensitive demodulator 151 through a three-position switch 152 and a reversing switch 153. The three-position switch 152 is included in a connection 154 between the movable tap 149 of the potentiometer resistance 147 and one input terminal of the reversing switch 153 and includes a movable arm 155 which has a "feed" position wherein the potentiometer resistance 147 and the reversing switch 153 are electrically connected to each other, and a "crawl" position and a "rapid" position where the circuit between the potentiometer resistance 147 and the reversing switch 153 is broken. The reversing switch 153 includes a pair of output terminals 156, 157 with the terminal 156 being connected to one of the input terminals of the phase-sensitive demodulator 151 by a connection 156a, the demodulator having the other input terminal grounded, and the terminal 157 being connected to ground by a connection 157a. The connection 156a includes contacts 158 of a turret run-stop switch 159, the function of which is described in more detail hereinafter. The connection 157a includes an output coil 160 of the induction tachometer 132 geared to the drive for the turret. The turret induction tachometer 132, like the spindle induction tachometer 140, has a field coil 161 energized from the oscillator 143 and an output voltage which is of a phase dependent upon the direction of operation of the motor 17. The output coil 160 of the tachometer 140 is connected into the circuit so that the output voltage hereof opposes the voltage from the spindle tachometer and tends to reduce the primary signal from the spindle as the motor 17 comes up to speed.

It can be seen that a signal which has a primary component dependent upon the direction and speed of rotation of the spindle and a component dependent upon the rate of movement of the turret, is applied to the input of the phase-sensitive demodulator. This signal to the phase-sensitive demodulator is compared with a reference signal derived from the oscillator 143 and applied to the input of the demodulator through a connection 164. The output of the phase-sensitive demodulator 151 is a direct current signal which has a magnitude dependent upon the magnitude of the alternating current signal applied to the input thereof and a polarity dependent upon the phase of the input.

The output of the phase-sensitive demodulator 151 is applied to the input of an adding circuit 165. In the illustrated embodiment the adding circuit 165 comprises three resistances 166, 167, 168 having their one ends connected to a common junction 170 which is connected to the input of a high gain D.C. amplifier 171, the amplifier having a feed-back resistor 171a connected between its output and input. The other ends of the resistances 166, 167, 168 are respectively connected to the output of the phase-sensitive demodulator 151, the output of a phase-sensitive demodulator 173, and the output of an integrating circuit 174 including an amplifier 175.

The output signal from the phase-sensitive demodulator 151 is connected to the adding circuit through a first path including the resistor 166 and through a second path including the integrating circuit 174. The integrating circuit 174 includes a resistance 177 having one side connected to the output of the phase-sensitive demodulator 151 and its other side connected to the input of the direct current amplifier 175. The input of the direct current amplifier is also connected to one side of a condenser 178 having its other side connected to the input of amplifier 171 of the adding circuit through the resistance 168 by a connection 179. The output of the direct current amplifier 175 of the integrating circuit is connected to the connection 179 between the condenser 178 and the resistance 168. As will be explained in more detail hereinafter, the integrating circuit 174 improves the performance of the control circuit for low magnitude input signals to the phase-sensitive demodulator 151.

The ouput of the adding circuit 165 constitutes an error signal for the torque motor 103 and is connected to a power amplifier 181 for the torque motor 103 through the two-position run-stop switch 159 having in addition to the contact 158, a contact 182 engageable by a contact arm 183 in the connection between the amplifier 171 and the power amplifier 181 and contacts 184a, 184b engageable by a contact arm 184 which is operated simultaneously with the contact arm 183. The polarity and magnitude of the output of the power amplifier 181 are dependent upon the polarity and magnitude of the output of the adding circuit 165 and the direction of movement of the torque motor 103 is determined by the polarity of the current and the extent thereof is determined by the magnitude of the current.

When the piston 31 is displaced from its neutral position to cause operation of the motor 17 a signal from the differential transformer 134 is supplied to the input of the adding circuit 165 which has a magnitude dependent upon the displacement of the piston 31 from its neutral position and a phase dependent upon the direction of displacement. As is shown in Fig. 4a, the differential transformer 134 has a pair of primary coils 185, 186 energized from the oscillator 143 and a secondary coil 187 which has an alternating current output whose instantaneous polarity or phase is dependent upon the direction of displacement of the core 135 from a central position between the primary coils 185, 186 and which has a magnitude determined by the extent of the displacement. It will be understood that when the core 135 is in a central position, the currents induced in the secondary coil 187 due to the currents flowing in the primary coils 185, 186 are opposite to each other in phase and are of equal magnitude so that the output of the secondary coil 187 is zero. The central position of the core 135 corresponds to the neutral position of the piston 31. The output of the secondary coil 187 of the differential transformer 134 is applied to the input of the phase-sensitive demodulator 173 and compared with a reference voltage from the oscillator 143 connected to the phase-sensitive demodulator 173 by a connection 188. As was previously stated, the output of the phase-sensitive demodulator 173 is connected to the adding circuit through the resistance 167 so that the output thereof is combined with the output of the phase-sensitive demodulator as applied directly to the summing circuit 165 and with the integrated ouput of the phase-sensitive demodulator 151. The sense of the signal component from the differential transformer is such as to oppose the signal from the spindle tachometer.

The ouput of the induction tachometer 132 and the output of the differential transformer 134 provide signal components which operate in opposition to the signal from the spindle induction tachometer 140 to control torque motor 103 and to provide a control system which is extremely fast in its response and which is not subject to hunting. It will be seen that the output of the differential transformer 134 is dependent upon the position of the piston 31 and the output of the induction tachometer 132 is dependent upon the velocity of the turret. The described system provides a closed servo system.

The operation of the circuit as thus far described is as follows: Assuming the machine to be stopped, the spindle of the machine is set to rotate at a particular speed by any conventional control means and the switch 182 is operated to complete the control circuit to permit operation of the turret. The rotation of the spindle produces an output voltage at the output terminals of the induction tachometer 140 and causes a primary voltage signal to appear across the selected portion of the potentiometer resistance 147. Since the turret is in a stop position, the full voltage drop across the selected portion of the potentiometer resistance 147 is applied to the input of the phase-sensitive demodulator 151. The output of the phase-sensitive demodulator is a direct current signal having polarity, or sense, and magnitude dependent on the phase and magnitude of the input to the demodulator and when the switch 159 is in its run position energizes the torque motor 103 to move the armature in a direction and an amount dependent upon the polarity and magnitude of the direct current signal. The movement of the armature is such as to displace the servo valve 93 in a direction to cause movement of the piston 31 in a direction to reduce the direct current error signal for controlling the operation of the motor 17 for driving the turret. When the turret is starting from a stop position the direction of operation of the motor 17, is dependent upon the phase of the signal from the spindle tachometer.

As soon as the piston 31 is displaced from its neutral position the differential transformer 135 will have an output signal which is combined with the signal from the spindle in the summing circuit 165 to reduce the error signal energizing the torque motor 103. When the piston 31 has moved so as to supply fluid pressure to the motor 17 to cause rotation thereof the induction tachometer 132 will provide an output signal which has a polarity and magnitude dependent upon the direction and speed of operation of the motor 17 and which also functions to oppose or diminish the signal from the spindle tachometer 140. When the turrent assumes the particular speed corresponding to the particular speed of the spindle, the outputs of the induction tachometer 132 and the differential transformer 134 will equal the signal from the spindle tachometer 140 so that the error signal from the summing circuit is zero and the torque motor 103 is returned to its zero position with the land 97 positioned centrally of the recess 96 and the piston 31 will remain in its displaced position as long as the speed of the turret corresponds to the speed of the spindle.

If the turret speed exceeds the speed corresponding to the particular spindle speed the phase of the signal input to the phase-sensitive demodulator reverses since the output of the tachometer 132, together with the output of differential transformer 134, will be greater than that necessary to equalize the signal from the spindle tachometer 140. This will cause the torque motor to shift the servo valve to move the piston 31 in the direction necessary to decrease the speed of motor 17 and the torque motor armature will be returned to its zero or neutral position when the signal components from the differential transformer 134 and the turret tachometer 132 again equalize the signal from the spindle.

The direction of movement of the turret for a given direction of spindle rotation is controlled by the reversing switch 153 which will reverse the phase of the voltage signal at the potentiometer resistance 147 as seen by the phase-sensitive demodulator.

The integrating circuit 174 improves the performance of the control circuit at low spindle speeds where the signal from spindle tachometer 140 and the signal from the turret tachometer 132 are of small amplitude. The integrated output signal of the phase-sensitive demodulator will assume control at the lower speeds and provide improved performance and control.

The corresponding speed of the turret for a given spindle speed of rotation may be adjusted by adjusting the tap 149 of the potentiometer resistance 147 to control the portion of the voltage drop across the resistance which is applied to the demodulator 151.

The turret may be operated at a crawl speed or a rapid traverse rate, both of which are independent of the speed of rotation of the spindle by operating the switch 152 to its position corresponding to the desired speed. This breaks the connection between the spindle tachometer 140 and the reversing switch 153 and connects the reversing switch 153 to the output of a secondary coil 189 of a transformer 190 having a primary 191 energized by the oscillator 143. The output circuit of the secondary coil 189 includes series-connected potentiometer resistances 192, 193 having movable taps 194, 195 respectively. The movable tap 194 is connected to a contact 196 of the switch 152 which is engaged by the switch arm 155 when the arm is in a rapid position while the tap 195 is connected to a contact 197 of the switch 152 which is engaged by the arm 155 when the latter is in its "crawl" position. The side of the secondary coil 189 remote from the potentiometer resistance 192 is connected to the end 147a of the potentiometer resistance 147 which, in turn, is connected to the one input terminal of reversing switch 153. It will be seen from the circuit diagram that if the arm 155 is in the "rapid" position, the movable tap 194 of the potentiometer resistance 192 is connected to the reversing switch 153 and a maximum voltage is applied thereto, while if the arm 155 is in the "crawl" position then the tap 195 is connected to the reversing switch 153 and a minimum voltage is applied to the reversing switch. In this manner, "rapid" traverse and "crawl" rates are obtained.

The turret run-stop switch 159 controls the energizing circuit for the torque motor 103 and when moved to its stop position opens the circuit at contacts 158 and 182. The opening of circuit at contact 158 disconnects the spindle tachometer and the turret tachometer from the photo-sensitive demodulator 151 and the adding circuit 165 while the opening of the circuit at contact 182 breaks the connection between the adding circuit and the power amplifier 121 and connects the input of the power amplifier to ground. The opening of the circuit at contact 158 prevents a charge from building up on condenser 178 when the turret is stopped and the grounding of the power amplifier prevents the discharge through the amplifier of the charge on the condenser at the time of stopping.

In addition to controlling the circuit for energizing the torque motor 103, the switch 159 also, by means of the contacts 184a, 184b controls the energization of the turret stop valve 38 and a turret brake 198 which are energized from a full wave rectifier circuit 200. When the contact 182 of the switch 159 is engaged by the arm 183 to complete the control circuit for the torque motor 103, the contact arm 184 is in engagement with contact 184a and completes a circuit for energizing the solenoid 54 of the turret stop valve 38. In this position the circuit to the turret brake 198 is broken. When the contact arm 183 is moved to disengage the contact 182, the contact arm 184 is moved to a position in engagement with contact 184b to break the circuit to the turret stop valve to de-energize the solenoid 54 and complete the circuit to the turret brake 198.

The variable displacement pump 26 is controlled in the same manner as the pump 25 to drive either the cross slide or the cross slide carriage, depending upon the setting of the selector valve 110, at a speed determined by the spindle speed. Referring to Figs. 4 and 4a it will be seen that a portion of the voltage appearing across the potentiometer resistance 148 is connected to the input of a phase-sensitive demodulator 205 through a speed selector switch 206 and a double pole double throw reversing switch 207. The phase of the voltage applied to the input of the phase-sensitive demodulator 205 is, as in the circuit for controlling the movement of the turret, dependent upon the direction of spindle rotation and the position of the reversing switch 207. The speed selector switch 206, like the turret speed switch 152, has a feed position, a crawl position, and a rapid position. In the feed position a circuit is completed from the movable tap 149 of the potentiometer resistance 148 to the reversing switch 207 and is broken when the switch is in any of its other positions.

The reversing switch 207 has output terminals 208, 209 connected to the input of the phase-sensitive demodulator 205. The terminal 209 is connected to the input of the phase-sensitive demodulator 205 by a connection 212 while the terminal 208 is selectively connectible to the phase-sensitive demodulator through either an output coil 213 of the cross slide carriage induction tachometer 130 or an output coil 214 of the cross slide induction tachometer 133, as determined by the setting of a two-position selector switch 215. The output coils 213, 214 have one side connected to the terminal 208 of the reversing switch and their other sides connected respectively to contacts 216, 217 of the switch 215. When the switch 215 is in one of its positions, a switch arm 218 connected to the input of the phase-sensitive demodulator 205 through ground is in engagement with the contact 216 to connect the cross slide carriage tachometer 130 with the input of the phase-sensitive demodulator and when in its other position connects the output coil 214 to the input of the phase-sensitive demodulator. As in the case of the control circuit for the turret, the voltages induced in the output coils 213, 214 oppose the primary signal from the induction tachometer 140. The induction tachometers 130, 133 each include a field coil 220 energized from the oscillator 143.

The selector switch 215 also includes a switch arm 221 which controls the energization of a solenoid 222 for operating the selector valve 110 to one of its positions. When the switch 215 is in its position where the switch arm 218 connects the output coil of the cross slide carriage to the phase-sensitive demodulator 205 the switch arm 221 is in engagement with a contact 223 which completes a circuit for energizing the solenoid of the selector valve to move the valve to its position where pressure fluid is supplied to the motor 15 upon operation of the pump 26. When the switch 215 is in its other position where the output coil of the cross slide tachometer 133 is connected to the input of the phase-sensitive demodulator, the switch arm 221 is moved to a position where the circuit to the solenoid 222 of the selector valve 110 is broken allowing the spring bias on the valve member 111 to move the valve member to a position where pressure fluid is supplied to the motor 18. The circuit completed by the switch arm 221 to energize the selector valve 222 includes full-wave rectifier bridge 200.

The output of the phase-sensitive demodulator 205 is a direct current signal which has a polarity dependent upon the phase of the input signal to the phase-sensitive demodulator with respect to a reference voltage supplied to the phase-sensitive demodulator from the oscillator 143. The magnitude of the direct current signal from the phase-sensitive demodulator 205 is dependent upon the amplitude of the alternating current input signal. The direct current output signal of the demodulator is applied to a power amplifier 225 through an adding circuit 226, to control the energization of the torque motor 103'. The adding circuit 226 includes a high gain direct current amplifier 227 to which the output of the phase-sensitive demodulator 205 is applied directly through a resistor 228, and to the input of which a signal representative of the integrated output of the phase-sensitive demodulator 205 is applied through a resistor 229 as well as a direct current signal indicative of the position of the control rod of the variable displacement pump 26 which is applied through a resistor 330. The output of the direct current amplifier is fed back to its input through a resistor 331, as in the case of the direct current amplifier 171. The integrated output signal of the phase-sensitive demodulator 205 is obtained from an integrating circuit 333 which is the same as the integrating circuit 174 and the description thereof will not be repeated.

The signal indicative of the position of the control rod of the variable displacement pump 26 is obtained from a circuit including the differential transformer 136 and a phase-sensitive demodulator 334 which cooperate in the same manner as the differential transformer 134 and the phase-sensitive demodulator 173 to provide a direct current signal which has a polarity dependent upon the direction of displacement of the control rod of the pump 26 from its neutral position and a magnitude dependent upon the extent of the displacement.

A run-stop switch 336 is provided for controlling the operation of the cross slide and cross slide carriage and has contacts included in the connections between reversing switch 207 and the demodulator 205 and between the adding circuit 226 and the power amplifier 225. To this end the switch 336 has a switch arm 337, which, when in its run position, engages a contact 337a to complete the circuit between the direct current amplifier 227 and the power amplifier 225 and when in its other position engages a contact 337b to connect the input of the power amplifier 225 to ground. The switch 336 also includes a switch arm 338 and a contact 338a engaged thereby when the switch 336 is in its run position. The contact 338a and switch arm 338 are included in the connection 212 and break the connection between the reversing switch 207 and the phase demodulator 205 when the switch 336 is in a stop position.

The energization of the solenoid 54' for operating the stop valve 38' to its position permitting the flow of pressure fluid from the pump 26 to the valve 40' is also controlled by the switch 336 which has a second contact arm 340. When the switch 336 is in its position where the circuit between the adding circuit 226 and the power amplifier 225 is completed by the switch arm 337, the switch arm 340 thereof engages contact 341 for completing a circuit from the rectifier 209 to energize the solenoid 54' and shift the valve member of the valve 38'. When the switch 336 is in its stop position, the switch arm 340 engages a contact 342 which completes a circuit from the rectifier 200 to energize a brake 344 for the cross slide carriage or a brake 345 for the cross slide, depending on the position of selector switch 215. A wire 346 connects the contact 342 of run-stop switch 336 to a switch arm 347 of the switch 215 which, when the switch 215 is in its position for conditioning the control circuit to move the cross slide carriage, engages a contact 348 for completing a circuit to the cross slide brake to energize the latter, provided the switch 336 is in its stop position, and when the switch 215 is in its position for conditioning the circuit to operate the cross slide, engages a contact 349 for completing a circuit through the connection 345 to the cross slide carriage brake 344.

The switch 215 also includes a switch arm 350 which completes a circuit from the full-wave rectifier 200 through a connection 351 to energize the cross slide carriage brake 344 when the switch 215 is in its cross slide operating position and which completes a circuit for energizing the cross slide brake 345 when the switch 215 is in its cross slide carriage operating position.

It can now be seen that when the switch 215 is in one of its operating positions for selecting one of the motors controlled thereby and the start-stop 336 is in its run position, a brake is energized for preventing movement of the other motor controlled by the switch 215 and when the switch 336 is moved to its stop position both of the brakes 344, 345 will be energized.

The cross slide and the cross slide carriage may be moved at crawl or rapid traverse rates by operating the selector switch 206 to disconnect the potentiometer resistance 146 from the control circuit and connect the input terminals of the reversing switch 207 to the output circuit of a secondary coil 352 of the transformer 135. The output circuit of the secondary coil 352 includes series connected potentiometer resistances 353, 354 and to obtain rapid traverse, the selector switch 206 connects the resistance 354 and a portion of the resistance 353 across the input terminals of the reversing switch 207 while to obtain the crawl rate the selector switch 206 connects only a portion of the potentiometer resistance 354 across the input terminals of the reversing switch 207.

It can now be seen that the present invention provides a new and improved drive for operating a machine tool element, or other member, in accordance with a primary input signal, which drive has a fast response to the primary signal and enables the element or member to be accurately controlled. In the disclosed drive, a speed control member is provided which is movable in opposite directions from a neutral position to control the direction of movement of the machine tool element controlled thereby, which may be the cross slide or the cross slide carriage, and the speed of the element is dependent on the displacement of the control member from its neutral position. From the foregoing description, it can be seen that the pistons of the variable displacement pumps each function as the described speed control member since the machine tool element controlled by each is moved at a speed determined by the displacement of the piston and in directions determined by the direction of displacement of the piston from its neutral position, the pistons being displaced in directions and distances dependent upon the direction and speed of spindle rotation.

While the preferred form of the invention has been described in considerable detail, it will be understood that modifications and changes may be made and that it is hereby my intention to cover all such modifications and changes which fall within the ability of those skilled in the art and the scope of the appended claims.

Having thus described my invention what I claim is:

1. In a machine tool having a rotatable spindle and a machine tool element to be moved relative to each other to effect a relative feed movement between a tool and a workpiece, means for effecting the relative feed movement between said spindle and said element including a speed control member movable in different directions from a neutral position to effect said relative feed movement in different directions with the speed of relative movement depending upon the displacement of the control member from its neutral position, and means for displacing said control member from its neutral position in a direction dependent upon the direction rotation of the spindle with the magnitude of the displacement depending on the speed of rotation of the spindle.

2. In a machine tool having a rotatable spindle and a machine tool element to be moved relative to each other to effect a relative feed movement between a tool and a workpiece, means for effecting the relative feed movement between said spindle and said element including a fluid pressure motor and a variable displacement pump for supplying fluid pressure to said motor, said pump having a control member displaceable in opposite directions from a neutral position to effect said relative feed movement in opposite directions at a rate determined by the displacement of said control member from its neutral position, and means for displacing said control member from its neutral position in a direction dependent upon the direction rotation of the spindle with the magnitude of the displacement depending on the speed of rotation of the spindle.

3. In a machine tool having a rotatable spindle and a machine tool element to be moved relative to each other to effect a relative feed movement between a tool and a workpiece, means for effecting the relative feed movement between said spindle and said element including a speed control member movable in different directions from a neutral position to effect said relative movement in different directions with the speed of movement depending upon the displacement of the control member from its neutral position, and means for displacing said control member from its neutral position in a direction dependent upon the direction of spindle rotation with the magnitude of the displacement depending on the speed of rotation of the spindle including first circuit means comprising an electrical device responsive to spindle rotation for providing a primary signal having a sense dependent on the direction of spindle rotation and a magnitude dependent on the speed of spindle rotation, electrical means responsive to the sense of an input signal for moving said control member in a direction dependent on the sense of the input signal, and second circuit means for applying said primary signal to the input of said electrical means including means to reduce said primary signal to zero when said element is moving in accordance with said primary signal.

4. A drive system for effecting a relative feed movement between an element and a rotating spindle, the latter being selectively rotatable in either direction about its axis, comprising means for effecting the relative feed movement between said spindle and said element including a reversible fluid pressure motor and a variable displacement pump for supplying fluid pressure to said motor, said pump having a control member displaceable in opposite directions from a neutral position to determine the speed and direction of movement of said element, and means for displacing said control member from its neutral position in a direction dependent upon the direction of spindle rotation with the magnitude of the displacement depending on the speed of rotation of the spindle including first circuit means comprising an electrical device responsive to spindle rotation for providing a primary signal having a sense dependent on the direction of spindle rotation and a magnitude dependent on the speed of spindle rotation, electrical means responsive to the sense of an input signal for moving said control member in a direction dependent on the sense of the input signal, and second circuit means for applying said primary signal to the input of said electrical means including means to reduce said primary signal to zero when said element is moving in accordance with said primary signal.

5. In a machine tool having a rotatable spindle and a machine tool element to be moved relative to each other to effect a relative feed movement between a tool and a workpiece, means for effecting the relative feed movement between said spindle and said element including a speed control member movable in opposite directions from a neutral position to produce relative feed movement in opposite directions with the speed of movement depending upon the displacement of the control member from its neutral position, and means for displacing said control member from its neutral position in a direction dependent upon the rotation of the spindle with the magnitude of the displacement depending on the speed of rotation of the spindle and including means for reversing the direction of movement of the element for a given direction of spindle rotation.

6. A system for effecting relative feed movement between an element and a rotating spindle, the latter being selectively rotatable in either direction about its axis, comprising means for effecting the relative feed movement between said spindle and said element including a speed control member movable in different directions from a neutral position to control the direction of relative feed movement with the speed of movement depending upon the displacement of the controller from its neutral position, and means for displacing said controller from its neutral position in a direction dependent upon the direction of spindle rotation with the magnitude of the displacement depending on the speed of spindle rotation including first circuit means responsive to spindle rotation to provide a primary signal having a sense dependent on the direction of spindle rotation and a magnitude dependent on the speed of spindle rotation, electrical means responsive to the sense of an input signal for effecting movement of said control member in a direction dependent on the sense of the input signal, and second circuit means for applying said primary signal to the input of said electrical means including means to reduce said primary signal to zero as seen by said electrical means when said element is moving at the speed and in the direction corresponding to the magnitude and sense of said primary signal, said first circuit means including means for reversing the sense of said primary signal for a given direction of spindle rotation.

7. A system for effecting a relative feed movement between an element and a rotating spindle, means for effecting the relative feed movement between said spindle and said element including a fluid pressure motor and a pump for supplying fluid pressure to said motor, said pump having a control member displaceable from a neutral position to determine the speed of movement of said element, and means for displacing said control member from its neutral position including first circuit means responsive to spindle rotation to provide a first primary signal having a sense dependent on the direction of spindle rotation and a magnitude dependent on the speed of spindle rotation, second circuit means providing a second primary signal of predetermined magnitude and including means to adjust the magnitude thereof, electrical means responsive to the magnitude of an input signal for moving said control member, third circuit means for selectively applying one of said primary signals to the input of said electrical means including means to reduce the selected primary signal to zero as seen by said electrical means when said element is moving in accordance with the applied primary signal, and means for selectively reversing the sense of said first primary signal with respect to said electrical means.

8. In a machine tool having a rotatable spindle and a machine tool element to be moved relative to each other to effect a relative feed movement between a tool and a workpiece, means for effecting said relative feed movement between said spindle and said element including a speed control member movable in opposite directions from a neutral position to effect relative feed movement in opposite directions with the speed of movement depending upon the displacement of the control member from its neutral position, an electrical device responsive to spindle rotation for providing an output signal having a sense and magnitude dependent on direction and speed of spindle rotation, and means for displacing said control member from its neutral position in a direction dependent upon the rotation of the spindle with the magnitude of the displacement depending on the speed of rotation of the spindle, including means for producing signal components respectively having magnitudes and senses indicative of the position and direction of displacement from its neutral position of said control member and the speed and direction of relative feed movement between said element and spindle and combining said components with said output signal to reduce the output signal to zero when the element is moving at the speed and in the direction corresponding to the magnitude of the output signal.

9. A system for effecting relative translatory movement between an element and a rotatable spindle comprising means for effecting the relative movement between said spindle and said element including a fluid pressure motor and a variable displacement pump for supplying fluid pressure to said motor, said pump having a control member displaceable in opposite directions from a neutral position to determine the speed and direction of movement of said element, and means for displacing said control member from its neutral position in a direction dependent upon the rotation of the spindle with the magnitude of the displacement depending on the speed of rotation of the spindle, comprising means providing an output signal having a magnitude dependent upon the speed of spindle rotation and including means for producing signal components indicative of the position of said control member and the speed of movement of said element and combining said components with said output signal to reduce the output signal to zero when the element is moving at the speed corresponding to the magnitude of the output signal.

10. In a machine tool, a machine tool element movable in opposite directions to effect relative feed movement with respect to a rotatable spindle, means providing a primary signal having a sense and magnitude dependent upon the direction and speed of rotation of the spindle, means for driving the element including a speed control member displaceable from a neutral position with the direction and magnitude of displacement from the neutral position determining respectively the direction and speed of movement of the element, means providing a signal having a sense and magnitude respectively dependent upon the direction and speed of movement of said element, and circuit means combining said signals to provide an error signal having a sense and magnitude indicative of the direction and size of error in the speed of movement of said element and means responsive to said error signal to move said control member in a direction to reduce said error signal including a second member movable in opposite directions from a neutral position to cause movement of the control member in opposite directions and returnable to its neutral position to stop the movement of said control member and means responsive to said error signal for moving said second member.

11. In a machine tool, a machine tool element movable in opposite directions to effect a relative feed with respect to a rotatable spindle, means providing a primary signal having a sense and magnitude respectively dependent on the desired direction and speed of rotation of the spindle, means for driving the element including a fluid pressure motor and a variable displacement pump for supplying fluid pressure to said motor, said pump having a control member displaceable in opposite directions from a neutral position to determine the speed and direction of movement of said element, means providing a signal having a sense and magnitude respectively dependent upon the direction and speed of movement of said element, and circuit means combining said signals to provide an error signal having a sense and magnitude indicative of the direction and size of error in the speed of movement of said element and means responsive to said error signal to move said control member in a direction to reduce said error signal including a second member movable in opposite directions from a neutral position to cause movement of the control member in opposite directions and returnable to its neutral position to stop the movement of said control member and means responsive to said error signal for moving said second member.

12. A system for effecting movement of an element in accordance with the rotation of a spindle comprising means for effecting movement of said element including a speed control member displaceable from a neutral position to determine the speed of movement of the element, means responsive to spindle rotation to provide a primary signal having a magnitude dependent on the speed of rotation, means providing a rate signal dependent on the speed of movement of said element, circuit means combining said signals with the signals in opposition to each other to provide a combined signal, an integrating circuit for integrating said combined signal, means for providing a second signal dependent on the displacement of said control member from said neutral position, means for summing the combined signal and the integrated combined signal and said second signal to provide an error signal having a sense dependent on the direction of error, and means responsive to said error signal for moving said control member to reduce the error signal.

13. A system for effecting movement of a movable element in accordance with the rotation of a rotatable spindle comprising means for effecting movement of said element in either of two opposite directions including a speed controller displaceable in opposite directions from a zero position to determine the direction and speed of movement of the element, means providing a primary signal having a sense and magnitude dependent on direction and speed of spindle rotation, means providing a second signal having a magnitude and sense respectively dependent upon the speed and direction of movement of the element, circuit means for combining said signals but with the second signal in opposition to the primary signal when the element is moving in the direction corresponding to the sense of the primary signal to provide a combined signal, circuit means for integrating the combined signal to provide an integrated signal, means for providing a position signal having a sense and magnitude dependent on the direction and magnitude of displacement of said control member from its zero position, circuit means for summing said position signal and said combined signal and said integrated signal to provide an error signal having a magnitude and sense indicative of the size and direction of error in the speed of movement of said element, and means responsive to the said error signal for moving said control member in a direction to reduce the error signal.

14. In a system comprising a controlled element to be moved in a direction and at a speed corresponding to the sense and magnitude of an alternating current primary signal and means for moving the element including a control member movable in different directions from a neutral position to determine the direction and rate of movement of said element, means for providing said primary signal, a phase-sensitive demodulator having an output direct current signal of a polarity and magnitude dependent on the sense and magnitude of an alternating current applied to the input of the demodulator, circuit means for applying said primary signal to the input of said demodulator, circuit means for integrating the direct current output signal of said demodulator, a summing circuit for summing the integrated output signal and the direct current output signal of said demodulator, means responsive to the output of said summing circuit for moving said control member in a direction dependent upon the polarity of the output of the summing circuit, means responsive to the movement of said element for providing a rate signal having a sense and magnitude dependent on the direction and speed of movement of the element, means providing a position signal having a sense and magnitude dependent on the direction and magnitude of displacement of said control member from its neutral position, circuit means applying said rate signal to the input of said demodulator in phase opposition to said primary signal when the element is moving in the direction called for by the primary signal, and means for applying said position signal to said summing circuit to oppose the output of said demodulator when the latter output signal has a sense corresponding to the sense of the primary signal.

15. In a system comprising a controlled element to be moved in a direction and at a speed corresponding to the sense and magnitude of an alternating current primary signal and means for driving the element including a control member movable in opposite directions from a neutral position for determining the rate and direction of movement of the element, a fluid pressure motor for moving the control member, a servo valve for controlling the fluid pressure in said motor and movable in opposite directions from a neutral position to cause operation of said motor in opposite directions and returnable to its neutral position to stop said motor, a torque motor for shifting said valve from its neutral position and in a direction dependent upon the sense of the energizing current in the motor and for returning the valve to its neutral position upon the effective deenergization of the torque motor, means for providing said primary signal, a phase-sensitive demodulator having an output direct current signal of a polarity and magnitude dependent on the sense and magnitude of an alternating current applied to the input thereof, circuit means for applying said primary signal to the input of said demodulator, circuit means for integrating the direct current output signal of said demodulator, a summing circuit for summing the integrated output signal and the direct current output signal of said demodulator, circuit means for applying the output of said summing circuit to said torque motor, means responsive to the movement of said element for providing a rate signal having a sense and magnitude dependent on the direction and speed of movement of the element, means providing a position signal having a sense and magnitude dependent on the direction and magnitude of displacement of said control member from its zero position, circuit means applying said rate signal to the input of said demodulator and in opposition to said primary signal when the element is moving in the direction called for by the primary signal, and means for applying said position signal to said summing circuit in opposition to the output signal of said demodulator when the latter has a sense corresponding to the sense of the primary signal.

16. A system for effecting relative translatory movement between an element and a rotatable spindle, the spindle being selectively rotatable in either direction about its axis, said system comprising a variable displacement pump having first and second connections functioning as intake and discharge connections and a control member displaceable from a neutral position for controlling the volume of fluid pumped and the direction of pumping, said first and second connections functioning respectively as discharge and intake connections when the control rod is displaced in one direction from its neutral position and respectively as intake and discharge connections when displaced in the other direction, a reversible fluid pressure motor for effecting said translatory movement and having opposite sides thereof connected to different ones of said connections, a fluid pressure motor for shifting said control member including a differential piston having small and large area sides, means for supplying pressure fluid at a constant pressure to the small area side of said piston, means for supplying fluid pressure to the large area side of said piston including a servo valve movable to vary the pressure on the large area side and having a neutral position where the force on the large area side balances the force on the small area side of the piston, a torque motor for shifting said valve in a direction from its neutral position dependent on the sense of the energizing current for the torque motor, circuit means for providing a first signal having a sense and magnitude determined by the direction and rate of spindle rotation, means providing a second signal having a sense and magnitude determined by the direction and rate of movement of the element, means providing a third signal having a sense and magnitude determined by the direction and magnitude of displacement of said control member from the latter's neutral position, and circuit means for combining said signals to provide an error signal for energizing said torque motor, the first mentioned circuit means including means for shifting the phase of said first signal 180° for a given direction of spindle rotation.

17. In a system for controlling an element to be moved in opposite directions and including a variable displacement pump having first and second connections functioning as intake and discharge connections and a control member movable to control the volume of pressure fluid pumped, a fluid pressure motor having opposite sides, a fluid pressure circuit connecting the opposite sides of said motor to different ones of said connections, a stop valve in said fluid pressure circuit and disposed between said pump and said motor and having a run position connecting said motor to said pump and a stop position wherein said intake and discharge connections are connected to each other, actuating means for operating said valve between its said positions, a power actuated brake for braking the operation of said motor, signal producing means providing an error signal which is a differential signal having a primary signal component with a sense and magnitude indicative of the desired direction and rate of movement and a feedback component from the element and drive therefor, electrically controlled means responsive to said error signal for actuating said control member, and start-stop switching means for selectively rendering said signal producing ineffective to actuate said electrically controlled means including means for energizing said brake and actuating said valve to said second position when said signal producing means is rendered ineffective.

18. A drive for effecting movement of an element in opposite directions comprising a variable displacement pump having first and second connections functioning as intake and discharge connections and a control member displaceable from a neutral position for controlling the volume of fluid pumped and direction of pumping, said first and second connections functioning respectively as discharge and intake connections when the control rod is displaced in one direction from its neutral position and respectively as intake and discharge connections when displaced in the other direction from its neutral position, a reversible fluid pressure motor connected to drive said element and having opposite sides thereof connected to different ones of said connections in a closed circuit therewith, said closed circuit including a valve having a first position placing said first and second connections in communication with said motor and a second position in which said first and second connections are placed in communication with each other, actuating means for operating said valve between its said positions, a power actuated brake for braking the operation of said motor, signal producing means providing an error signal which is a differential signal having a primary signal component with a sense and magnitude indicative of the desired direction and rate of movement and a feedback component from the element and drive therefor, electrically controlled means responsive to said error signal for actuating said control member, and start-stop switching means for selectively rendering said signal producing ineffective to actuate said electrically controlled means including means for energizing said brake and actuating said valve to said second position when said signal producing means is rendered ineffective.

19. A system for effecting movement of an element in opposite directions comprising a variable displacement pump having first and second connections functioning as intake and discharge connections and a control member displaceable from a neutral position for controlling the volume of fluid pumped and direction of pumping, said first and second connections functioning respectively as discharge and intake connections when the control rod is displaced in one direction from its neutral position and respectively as intake and discharge connections when displaced in the other direction from its neutral position, a reversible fluid pressure motor connected to drive said element and having opposite sides thereof connected to different ones of said connections in a closed circuit therewith, said closed circuit including a replenishing valve having a chamber and spring biased valve members for placing said chamber in communication with a respective one of said connections when the pressure in the connections is below a predetermined minimum, means for supplying a constant pressure to said chamber, a fluid pressure motor for shifting said control member including a differential piston having small and large area sides, means for supplying pressure fluid at a constant pressure to the small area side of said piston, means for supplying fluid pressure to the large area side of said piston including a servo valve movable to vary the pressure on the large area side and having a neutral position where the pressure fluid force on the large area side balances the pressure fluid force on the small area side, a torque motor for shifting said servo valve in a direction from the neutral position dependent on the sense of the energizing current for the torque motor, circuit means for providing a first signal having a sense and magnitude indicative of the desired direction and rate of movement of the element, means providing a second signal having a sense and magnitude dependent upon the direction and rate of movement of the element, means providing a third signal having a sense and magnitude dependent upon the direction and magnitude of displacement of said control member from the latter's neutral position, and circuit means for combining said signals to provide an error signal for energizing said torque motor.

20. In a system having an element to be moved in opposite directions, a variable displacement pump having first and second connections functioning as intake and discharge connections and a control member displaceable from a neutral position for controlling the volume of fluid pumped and direction of pumping, said first and second connections functioning respectively as discharge and intake connections when the control rod is displaced in one direction from its neutral position and respectively as intake and discharge connections when displaced in the other direction from its neutral position, a reversible fluid pressure motor having opposite sides thereof connected to different ones of said connections in a closed circuit therewith, said closed circuit including a replenishing valve having a chamber and spring biased valve members for placing said chamber in communication with a respective one of said connections when the pressure in the connections is below a predetermined minimum, a stop valve in said closed circuit betwen said pump and said replenishing valve actuatable to a run position placing said first and second connections in communication with said motor and a stop position placing said first and second connections in communication with each other, means for supplying a constant pressure to said chamber, a fluid pressure motor for shifting said control member including a differential piston having small and large area sides, means for supplying pressure fluid at a constant pressure to the small area side of said piston, means for supplying fluid pressure to the large area side of said piston including a servo valve movable to vary the pressure on the large area side and having a neutral position where the pressure fluid force on the large area side balances the pressure fluid force on the small area side, a torque motor for shifting said valve in a direction from the neutral position dependent on the polarity of the energizing current for the motor, circuit means providing an error signal for said torque motor having a sense magnitude indicative of the error between the movement of the element and the desired direction and rate of movement of the element, said circuit means including means for selectively and simultaneously actuating said stop valve to its said stop position and for effectively disconnecting the error signal from said torque motor.

21. A combined replenishing and safety valve for a fluid system comprising a valve body having a first and second passages therein and a third passage, respective means for placing said third passage in communication with said first and second passages including valve means operable when the difference in the pressure in the corresponding one of said first and second passages respectively exceeds the pressure in said third passage by a predetermined amount, said body having a fourth passage, means for placing said fourth passage in communication with said third passage when the pressure in the latter exceeds the pressure in the fourth passage by a predetermined amount, and third and fourth valve means for placing said fourth passage in communication with said first and second passages respectively, said third and fourth valve means respectively operating when the pressure in the fourth passage exceeds the pressure in the corresponding one of said first and second passages by a predetermined amount.

22. In a machine tool, the structure as defined in claim 19, wherein said valve further includes first and second passageways in communication with a respective one of said connections and a third passage, respective valve means associated with said first and second passages for placing said first and second passages respectively in communication with said third passage when the pressure in the respective one of said first and second passages exceeds the pressure in said third passage by a predetermined amount, and means for placing said chamber in communication with said third passage when the pressure in the latter exceeds the pressure in the chamber by a predetermined amount.

23. In a machine tool having a rotatable spindle and a machine tool element to be moved relative to each other to effect a relative feed movement between a tool and a workpiece, means for effecting the relative movement between said spindle and said element including a speed control member movable in different directions from a neutral position to effect said relative feed movement in different directions with the speed of movement depending upon the displacement of the control member from its neutral position comprising an electrical device providing an output signal having a polarity and magnitude dependent on the direction and speed of said spindle, means for producing signal components one having a polarity and magnitude indicative of the position of said control member and the direction of its displacement respectively and one having a magnitude and polarity indicative of the speed and direction of said element respectively, circuit means combining said components with said output signal to reduce the output signal to zero when the element is moving at the speed and in the direction corresponding to the output signal and to provide an error signal when the movement is not in accordance with said output signal, said circuit means including actuatable means for reversing the polarity of said output signal for a given direction of rotation of said spindle, and means responsive to said error signal for actuating said control member in a direction dependent on the polarity of said error signal.

24. In a machine tool having a rotatable spindle and a machine tool element to be moved relative to each other to effect a relative feed movement between a tool and workpiece, reversible variable speed power means operatively connected to effect said relative feed movement, control means for controlling the speed and direction of operation of said power means and responsive to an input signal to operate the power means at a speed and in a direction dependent upon the magnitude and sense respectively of the input signal, means providing a feedback signal having a magnitude and sense indicative of the speed and direction of movement of said element respectively, an electrical device providing an output signal having a sense and magnitude dependent upon the direction and speed of rotation of said spindle respectively, means combining said feedback signal with said output signal to reduce the output signal when the element is moving at a speed and in a direction corresponding to the magnitude and sense of the output signal and to provide an error signal, said circuit means including actuatable means for reversing the sense of said output signal for a given direction of rotation of said spindle, and means connecting said error signal to said control means as the input signal thereof.

25. In a machine tool having a rotatable spindle and a machine tool element to be moved relative to each other to effect a relative feed movement between a tool and workpiece, reversible variable speed power means operatively connected to effect said relative feed movement, control means for controlling the speed and direction of operation of said power means and responsive to an input signal to operate the power means at a speed and in a direction dependent upon the magnitude and sense respectively of the input signal, said control means having a condition which varies from zero in a direction dependent upon the direction of operation called for by the control means and which has a magnitude dependent upon the speed called for by the control means, means responsive to said condition and providing a first signal having a sense dependent upon the direction of variation of said condition from zero and a magnitude dependent upon the magnitude of said condition, means providing a second signal having a magnitude and sense indicative of the speed and direction of movement of said element respectively, an electrical device providing an output signal having a sense and magnitude dependent upon the direction and speed of rotation of said spindle respectively, means combining said first and second signals with said output signal to reduce the output signal when the element is moving at a speed and in a direction corresponding to the magnitude and sense of the output signal and to provide an error signal, said circuit means including actuatable means for reversing the sense of said output signal for a given direction of rotation of said spindle, and means connecting said error signal to said control means as the input signal thereof.

26. In a machine tool having a rotatable spindle and a machine tool element to be moved relative to each other to effect a relative feed movement between a tool and workpiece, variable speed power means operatively connected to effect said relative feed movement between said spindle and element, control means for controlling the speed of operation of said power means and responsive to an input signal to operate the power means at a speed dependent upon the magnitude of the input signal, said control means having a condition which varies from zero in accordance with the speed setting thereof, means responsive to said condition and providing a first signal having a magnitude dependent upon the speed setting of said control means, means responsive to spindle rotation to provide a primary signal having a magnitude dependent on the speed of rotation, means providing a rate signal dependent on the speed of movement of said element, circuit means combining said primary and rate signals with the signals in opposition to each other to provide a combined signal, an integrating circuit for integrating said combined signal, means for summing the combined signal and the integrated combined signal and said first signal to provide an error signal, and means for applying said error signal to said control means as the input signal thereof.

References Cited in the file of this patent

UNITED STATES PATENTS

| Number | Name | Date |
|---|---|---|
| 660,801 | Riddel | Oct. 30, 1900 |
| 1,961,089 | Smith et al. | May 29, 1931 |
| 2,036,821 | Munson | Apr. 7, 1936 |
| 2,237,015 | Stratton | Apr. 1, 1941 |
| 2,389,368 | King | Nov. 20, 1945 |
| 2,527,458 | Schurr | Oct. 24, 1950 |
| 2,561,724 | Bickel | July 24, 1951 |
| 2,590,769 | Herrstrum | Mar. 25, 1952 |
| 2,593,950 | Williams | Apr. 22, 1952 |
| 2,674,099 | Mason et al. | Apr. 6, 1954 |
| 2,756,771 | Spencer | July 31, 1956 |
| 2,784,359 | Kamm | Mar. 5, 1957 |